United States Patent [19]

Pommereau et al.

[11] 4,361,297
[45] Nov. 30, 1982

[54] ATMOSPHERIC EXPLORATION VEHICLE

[75] Inventors: Jean-Pierre Pommereau, Paris; Alain Hauchecorne, Palaiseau, both of France

[73] Assignee: A.N.V.A.R. (de l'Agence Nationale de Valorisation de la Recherche), Neuilly-sur-Seine, France

[21] Appl. No.: 278,394

[22] Filed: Jun. 29, 1981

Related U.S. Application Data

[63] Continuation of Ser. No. 13,012, Feb. 21, 1979, abandoned.

[30] Foreign Application Priority Data

Feb. 24, 1978 [FR] France .................... 78 05306

[51] Int. Cl.³ .................... B64B 1/40; B64B 1/62
[52] U.S. Cl. .................... 244/97; 244/31; 244/126
[58] Field of Search .................... 244/31, 33, 96, 97, 244/99, 126, 133

[56] References Cited

U.S. PATENT DOCUMENTS

| Re. 18,355 | 2/1932 | Carson | 244/133 |
|---|---|---|---|
| 1,714,079 | 5/1929 | Copeman | 244/99 |
| 2,266,836 | 12/1941 | Weioner | 244/99 |
| 2,931,597 | 4/1960 | Moore | 244/97 |
| 3,260,480 | 7/1966 | Ash et al. | 244/31 |
| 3,337,162 | 8/1967 | Bauserman | 244/31 |
| 3,565,368 | 2/1971 | Byron | 244/31 |
| 3,807,384 | 4/1974 | Schach et al. | 244/31 |
| 4,174,082 | 11/1979 | Echoo | 244/31 |

FOREIGN PATENT DOCUMENTS

| 1535761 | 7/1968 | France | 244/31 |
|---|---|---|---|
| 2256867 | 8/1975 | France | 244/31 |
| 2360089 | 3/1978 | France | 244/99 |
| 600970 | 6/1979 | U.S.S.R. | 244/31 |

Primary Examiner—Galen L. Barefoot
Attorney, Agent, or Firm—McAulay, Fields, Fisher, Goldstein & Nissen

[57] ABSTRACT

A vehicle for the exploration of the atmosphere comprising an infra-red and solar montgolfier (hot-air balloon) capable of being piloted reversibly. The vehicle comprises a gas-tight envelope in which the upper part of the envelope is either transparent to or slightly absorbent of infra-red radiation, the outer face of the upper part of the envelope is slightly emissive in the infra-red region of radiation and the inner face of the upper part absorbs infra-red radiation so that ascending forces which act on the montgolfier are only obtained as a result of the heating of the gas contained in the envelope which is produced by the absorption of infra-red radiation.

24 Claims, 4 Drawing Figures

ATMOSPHERIC EXPLORATION VEHICLE

This is a continuation of application Ser. No. 13,012 filed Feb. 21, 1979 now abandoned.

BACKGROUND OF THE INVENTION

The present invention relates to a vehicle for exploration of the atmosphere, and more particularly, its object is an infra-red and perhaps solar montgolfier (hot-air balloon) capable of being piloted reversibly. It is the result of work by Jean-Pierre Pommereau, Research Attache with the CNRS and Alain Hauchecorne, Research Bursary with the Centre National d'Etude Spatiales (CNES), done in the laboratories of the Aeronomy Department of the CNRS.

The use of aerostats, such as balloons, inflated with a gas lighter than air, or montgolfiers, formed of an envelope filled with heated air and inflated by a burner, are already known as vehicles for exploration of the atmosphere. But all known vehicles of this type have the drawback of limited life or flight time, and do not permit vertical exploration of the atmosphere by making alternate vertical movements of wide amplitude, since they can only carry a necessarily limited and quickly exhausted load of fuel, such as propane consumed by a burner heating the air, in the case of a montgolfier or of ballast, in the case of a balloon, or, again, in the latter case, owing to the fact that it is not possible, in order to cause a balloon to reascend, to replace the gas which was previously allowed to escape from the latter to cause it to descend. Generally speaking, these vehicles cannot be piloted in altitude in a reversible fashion, or according to a predetermined law. Furthermore, in order to improve the lift of montgolfiers, use has already been made of black fabrics or films, absorbing solar radiation, to constitute the envelope, in order to obtain additional heating of the air contained by the envelope, which provides supplementary lift, but these solar montgolfiers, which have been tested several times at low altitude, do not make it possible to remedy in decisive fashion, the drawbacks mentioned above.

The problem on which the present invention is based, is to design a vehicle for exploration of the atmosphere, whose life or flight time will be as long as possible and which, in a second stage, will be capable of being piloted reversibly, in order to maneuver in altitude according to a definite law.

SUMMARY OF THE INVENTION

With this in mind, the vehicle according to the invention, of the montgolfier type, is constituted by a gas-tight envelope capable of containing a gas and of carrying a pod of instruments constituting the useful load, and is characterized in that the under part of the envelope is transparent to, or slightly absorbent of infra-red radiation, and in that the outer face of the upper part of the envelope is slightly emissive in the infra-red, while the inner face of this same upper part, absorbs infra-red radiation so that the ascensional force acting on the montgolfier is obtained only from the heating of the gas contained in the envelope, produced by the absorption of infra-red radiation, coming from the planet whose atmosphere is being explored by the montgolfier, from this atmosphere itself, or from clouds as well. Since the gas heated in the envelope is preferably taken from the ambient atmosphere, the vehicle is thus completely autonomous, and its life span appears to be, theoretically, unlimited. As a matter of fact, its lifespan is limited only by the deterioration of its components.

In a form of embodiment whose lifespan can amount ot several months, the envelope comprises a gas-tight support, constituting the mechanical structure of the vehicle, which is transparent to infra-red radiation, the upper part of which is covered on the outside with a material slightly emissive in the infra-red, and on the inside with a material that absorbs infra-red.

Advantageously, however, the envelope is, also, covered on the outside with a material that absorbs visible solar radiation, but is transparent to infra-red radiation, so that the ascensional force acting on the envelope will also be obtained, by day, from the heating of the gas in the envelope, produced by the absorption of solar radiation. It is thus possible to vary the ascensional force of the vehicle by using the heating produced, both day and night, by the absorption of infra-red radiation, and, by day only, by absorption of the visible solar radiation.

In this form of embodiment, the montgolfier can be embodied to be induced by itself, to gain altitude during the day and lose it during the night. In the stratosphere, the temperature spread between the air contained in such an infra-red and solar montgolfier, and this ambient air, ranges from $+120°$ C. to $+160°$ C. by day and from $+10°$ C. to $+50°$ C. by night, according to the cloud cover. This thermal spread develops an ascensional force enabling the montgolfier to stay in flight and, perhaps, by itself, to perform continuous vertical movements of wide amplitude, ascending by day and descending by night. In order to obtain a vehicle capable of making these alternating and successive vertical movements on demand, both day and night, the montgolfier according to the invention is equipped, at the top of the envelope, with a valve means, which is opened and closed by a motor, supported by the envelope of the vehicle, at the base of which there is a permanent opening, larger in section than the valve means, so that it is possible to vary the volume of hot air contained in the envelope, by opening the valve means to evacuate it, if a descent of the montgolfier is desired, and reclosing the valve means to reheat the cool air introduced through the permanent opening at the base of the envelope, if a rise is desired.

In a preferred form of embodiment, the valve means consists of a mobile valve, with a structure identical to that of the upper part of the envelope, capable of sliding along a column, rigidly suspended from the upper part of the envelope to close or uncover an exhaust opening formed at the top of the envelope, under the influence of the motor driving a winch, mounted at the base of the column, and linked by at least one cable to the mobile valve.

Advantageously, the closing of the exhaust opening by the mobile valve is insured automatically by a spring, to insure the closing of the valve means in case of motor feed trouble, or malfunctioning of the winch or the motor, and thereby avoid the loss of the vehicle.

Finally, a very complete piloting of the vehicle will be obtained by controlling the opening of the valve means in a gradual and reversible fashion, for example, by remote control, by barometric control, or according to a predetermined law.

The present invention will be better understood with the aid of the particular example of embodiment which will now be described in non-limiting fashion, with reference to the attached figures in which:

DESCRIPTION OF THE PREFERRED EMBODIMENTS

Figure 1:
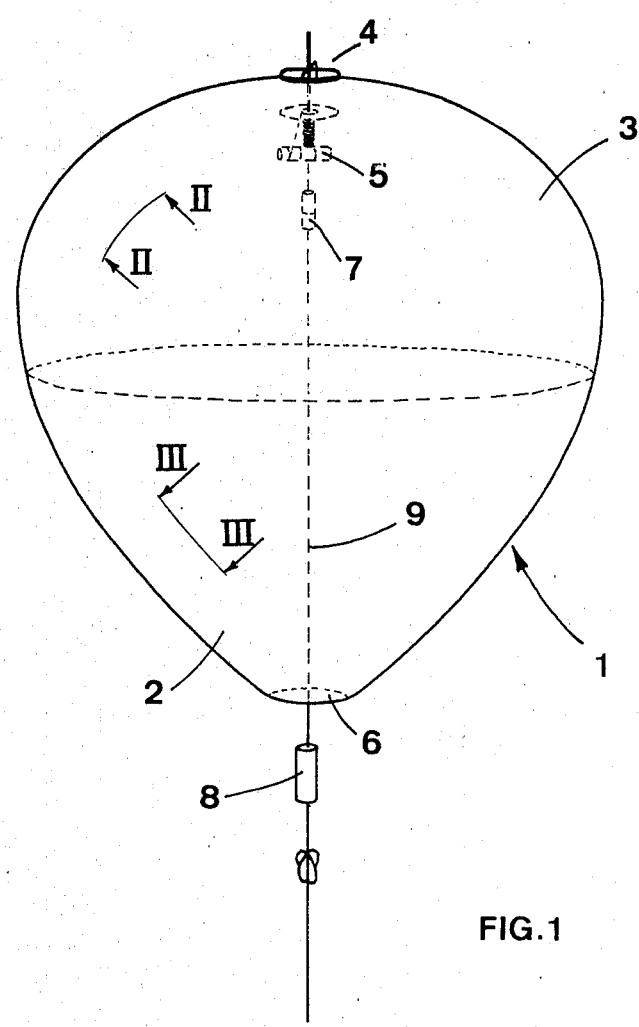
FIG. 1 is an overall view of an infra-red and solar montgolfier according to the invention, expanded and inflated, in flight condition.

Referring to FIG. 1, the vehicle designated by the name of infra-red and solar montgolfier comprises a balloon 1 which, when expanded and inflated, in flight condition, assumes a so-called natural form, i.e. the form of a teardrop with point directed downward. The envelope of the balloon 1 has two parts with very different thermo-optical properties: the under part 2 of the envelope is transparent to or slightly absorbent of infra-red radiation, while the inner face of the upper part 3 absorbs this infra-red radiation and the outer face of this same part 3 is slightly emissive in the infra-red, the two parts 2 and 3 absorbing the visible solar radiation.

At the top of the envelope, the balloon 1 is equipped with a valve means 4 whose opening and closing are controlled by a motor 5 supported by the envelope of the balloon 1, at the base of which there is a permanent opening 6, larger in section than that of valve means 4, designed to insure the filling of the balloon 1 by the gas available in the ambient atmosphere, for example, air if the terrestrial atmosphere is being explored.

The montfgolfier also has a piloting pod 7 and an instrument pod 8 constituting the useful load, suspended from the balloon 1 by means of a central cable 9.

Figure 2:
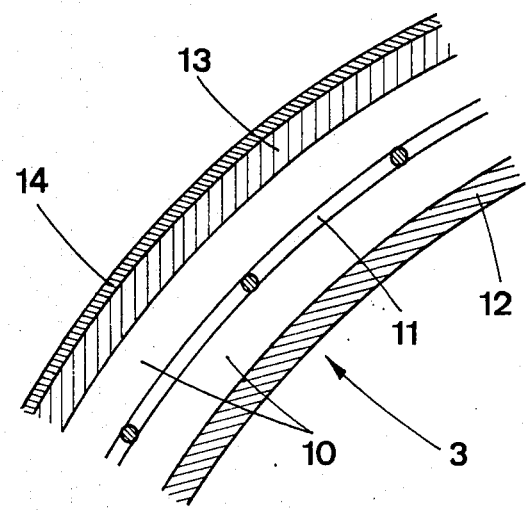
FIGS. 2 and 3 are sectional views of this montgolfier, respectively along lines II—II and III—III in FIG. 1.
Figure 3:
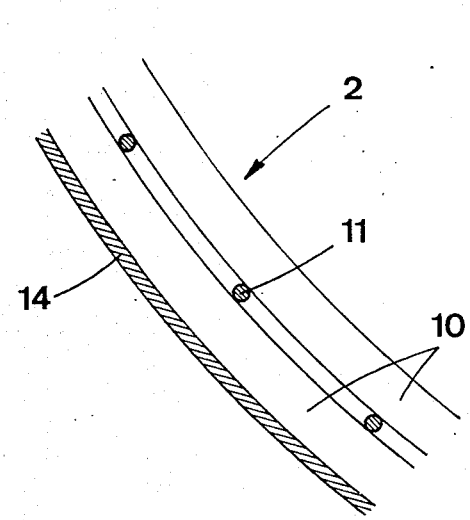

Referring to FIGS. 2 and 3, the envelope of the balloon 1 comprises a support, impermeable to the gas inflating the balloon 1, and constituting the mechanical structure of this balloon 1. The gas-tight support is embodied by means of plastic films or fabrics 10, for example of polyethylene or of nylon coated with polyurethane to insure gas-tightness, reinforced by a grid 11, constituted, for example, of nylon threads, such a support being transparent to infra-red radiation.

The thermo-optical properties of the upper part 3 of the envelope of the balloon 1, are defined on the one hand by an inner lining of the gas-tight support 10, constituted by a fine film of a varnish 12, perhaps, pigmented which absorbs infra-red radiation as well as, perhaps, the visible solar radiation, and, on the other hand, by an outer lining constituted by a material that is slightly emissive in the infra-red, such as a metal like aluminum, silver or gold, of which a thin layer 13 has been deposited, in vacuo on the gas-tight support 10.

If the gas-tight support 10 is likewise transparent to visible solar radiation, it is advantageous to cover the whole of the envelope of the balloon 1, on the outside, with a thin film 14, (on the order of 1 micron in thickness) of a varnish which absorbs the visible radiation but is transparent to infra-red radiation, such a film 14 not being necessary if the gas-tight support 10 itself absorbs visible solar radiation.

The thermo-optical properties of the under part 2 are defined only by the nature of the gas-tight support 10 and the film of varnish 14 if any.

In this way, by day and by night, the infra-red radiation passing through the under part 2 of the envelope, is absorbed by the inner face of the upper part 3 of the envelope, which is thus heated up, the gas, for example, air, contained in the envelope, heating up by convection in contact with the envelope.

Likewise, the absorption of visible solar radiation by day, produces a supplementary heating of the envelope, transmitted to the gas which it contains.

Thus the temperature spread between the gas contained in the montgolfier and the ambient gas, makes for an ascensional force, obtained solely from the heating of the gas contained in he envelope, produced by absorption of the infra-red radiation and the visible solar radiation, permitting the vehicle to stay in flight.

This vehicle can be piloted in altitude as desired, thanks to valve means 4, disposed at the top or upper pole of the balloon 1, cooperating with the permanent opening 6 situated at the base or lower pole, of the balloon 1.

Figure 4:
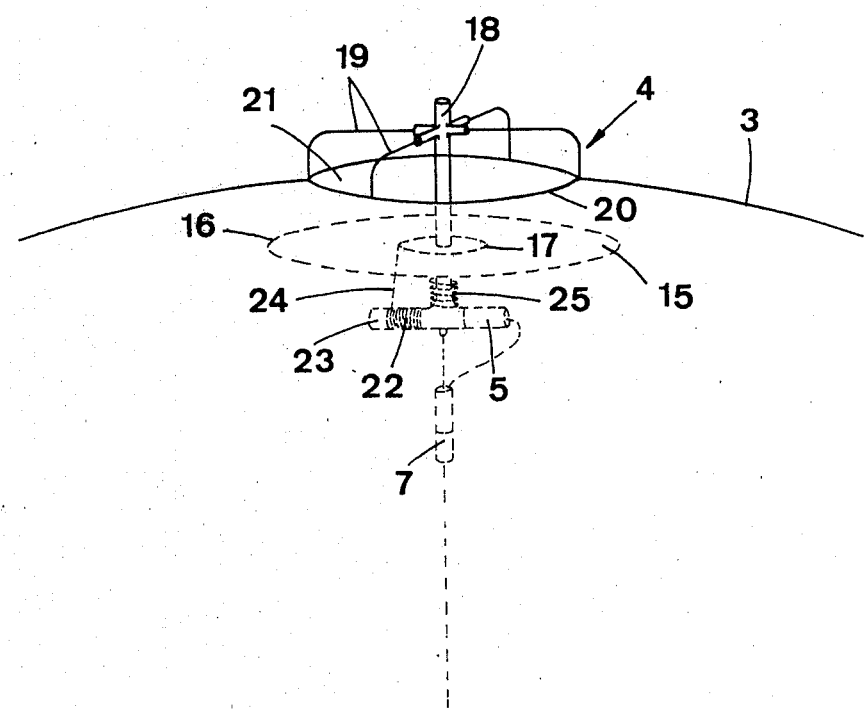
FIG. 4 represents the piloting valve means of this montgolfier.

Since the principle of piloting in altitude is based on control of the mean temperature of the gas filling the balloon 1, the role of valve means 4, which will now be described in more detail with reference to FIG. 4, is to permit the escape of a part of the hot gas from the balloon 1, which is immediately compensated in volume by an indraft of cold gas through the permanent opening 6 at the base, if it is desired to diminish the lifting force of the vehicle, and to stop its ascent and cause its descent.

Valve means 4 comprises a mobile valve 15, constituted by a disc with a central hole, made of the same materials and having the same structure as the upper part 3 of the envelope, and subtended by means of an outer hoop 16 and an inner hoop 17 of glass fiber. This mobile valve 15 can slide along a column 18, rigidly linked to the upper part 3 of the envelope, by attachment tubes 19, resting on glass fiber hoop 20 defining a circular exhaust opening 21, formed in the top of the envelope, and smaller in section than the permanent opening 6 at the base. The motor 5, of the reversible, electric micro-motor type, fed by batteries carried in the piloting pod 7, is borne at the base of column 18, and can drive in rotation, by means of clutch 23, a winch 22, adjacent to motor 5 and linked to the mobile valve 15 by at least one operating cable 24. Moreover, the closing of exhaust opening 21 by mobile valve 15 is elastically insured by a spring 25.

Upon the opening of valve means 4, controlled from the piloting pod 7, for example by remote control, barometric control or according to a predetermined law, by means of an on-board clockwork system, the mobile valve 15 is drawn toward winch 22 driven by motor 5, and uncovers the exhaust opening 21.

The heated gas escapes quickly, and the vehicle descends. The permanent opening 6 at the base of the balloon 1 permits an intake of cold gas in a quantity larger than that released through exhaust opening 21, so that the resulting compression maintains the form of the balloon 1, acting as a parachute.

At the desired moment, the piloting pod controls the closing of valve means 4 and mobile valve 15 closes exhaust opening 21, the gas contained in the balloon 1 heats up in a few minutes, and the vehicle rises again, this cycle being repeatable indefinitely, both day and night.

Spring 25 has the advantage of protecting the vehicle against any breakdown in the feed to motor 5, as well as against any malfunctioning of motor 5 and of clutch 23, by automatically insuring the closure of valve means 4.

Moreover, spring 25 permits making this gas-tight closure independent of the state of inflation of the balloon 1. It will also be noted that the balloon 1 will never be deflated in flight, since the section of exhaust opening 21 will always be smaller than that of the permanent opening 6 at the base.

And finally, by playing on the gradual opening of valve means 4, it is possible to obtain equilibrium at a preselected altitude level. Of course, an adequate telemetering, disposed in the piloting pod and transmitting to the ground, the state of opening of the valve, the ambient pressure, the ambient temperature and that of the gas inside the envelope of balloon 1, will facilitate the piloting of the vehicle.

The embodiment of the piloting valve means 4 is not limited to the one described above. It would be possible, without departing from the scope of the invention, to use an electric motor equipped with a gear cooperating with a rack to move the mobile valve. Likewise, the stroke of this mobile valve can be limited by means of end-of-stroke detectors serving as switches for the motor.

Carrying a pod, on board which the scientific instruments are placed, the vehicle according to the invention, capable of being piloted in altitude, either to make successive vertical excursions or to maneuver in altitude according to a predetermined law, can be applied in the study and the surveillance of the terrestrial atmosphere up to 45 km of altitude. This vehicle makes it possible to proceed with direct and continuous measurements in situ of the vertical profiles of parameters such as the composition of the atmosphere, the temperature, the radiations, the winds and states of turbulence.

The same type of vehicle would make it possible to explore the atmosphere of Venus from 9 to 75 km of altitude, as well as that of Titan, a satellite of Saturn, which are the only two planets in the solar system, aside from Earth, to have an atmosphere.

We claim:

1. A vehicle of the montgolfier type for the exploration of the atmosphere, comprising:
   a gas-tight envelope for containing a gas and carrying a load, said envelope including:
   an under wall part substantially transparent to infra-red radiation, and
   an upper wall part having an outer lining on said envelope slightly emissive to infra-red radiation and a covering on said envelope on said outer lining absorptive of the visible solar radiation coming from the atmosphere or an object in the atmosphere being explored and transparent to the infra-red radiation; and
   an inner lining on said upper part absorptive to the infra-red radiation transmitted through said outer lining and said under wall part.

2. The vehicle according to claim 1, including:
   a gas-tight support forming part of said envelope and being impermeable to the gas inflating said montgolfier, said support constituting the mechanical structure of said balloon and being transparent to infra-red radiation, said support including said upper wall part and said under wall part.

3. The vehicle according to claim 1, wherein said covering is:
   a thin film of varnish on the outside of said outer lining which absorbs visible radiation but is transparent to infra-red radiation.

4. The vehicle according to claim 3, wherein said thin film is approximately 1 micron in thickness.

5. The vehicle according to claim 4, wherein said film is a varnish which is approximately one micron in thickness.

6. The vehicle according to claim 1 or 2, wherein said outer lining is a metal selected from the group consisting of aluminum, silver and gold.

7. The vehicle according to claim 2, wherein said outer lining is a metal selected from the group consisting of aluminum, silver and gold, and which is deposited in vacuo as a thin lining onto said support.

8. The vehicle according to claim 2, wherein said covering is a thin film of varnish on said outer lining absorptive of visible radiation and transparent to infra-red radiation.

9. The vehicle according to claim 2, including:
   a film of varnish covering the inside of said upper wall part of said gas-tight support,
   said film absorbing infra-red radiation and being deposited in a fine film.

10. The vehicle according to claim 2, wherein said gas-tight support absorbs visible solar radiation.

11. The vehicle according to claim 1, including:
    valve means at the top of said envelope, said valve means having an exhaust opening;
    a motor supported by said envelope for controlling the opening and closing of said valve means thereby opening and closing said exhaust opening, and
    said envelope having a permanent opening at the base thereof, said exhaust opening being smaller than said permanent opening.

12. The vehicle according to claim 11, wherein said valve means includes:
    a mobile valve,
    a column rigidly suspended from the upper wall part of said envelope, said upper wall part being identical in structure to said mobile valve,
    said upper wall part of said envelope having said exhaust opening,
    a motor driven winch mounted at the base of said column, and
    a cable linking said winch to said valve to close and to open said exhaust opening.

13. The vehicle according to claim 2, wherein a metal is deposited in vacuo as thin lining onto said support.

14. The vehicle according to claim 13, including a spring coupled to said winch for insuring the closing of said exhaust opening by said mobile valve.

15. The vehicle according to claim 12, including means controlling the opening of said valve means in a gradual and reversible fashion.

16. The vehicle according to claim 15, wherein said control means includes a remote conrol, and a barometric control.

17. A vehicle of the montgolfier type for the exploration of the atmosphere in which visible sunlight and infra-red from the earth can be emitted comprising:
    a gas-tight envelope for containing a gas, said envelope including at least an under part including a wall portion having a good transmission coefficient to infra-red radiation.
    an upper part including at least an outer layer material having a slightly emissive coefficient to infra-red radiation and an inner layer material having a good absorption coefficient to infra-red radiation;
    said outer layer material being disposed between said inner layer material and light coming from the sun, and a film material covering said outer layer material, said film material having a good absorption coefficient to the visible sunlight and a good transmission coefficient to the infra-red radiation so that the ascension force acting on the montgolfier is obtained from the heating of the gas contained in the envelope.

18. The vehicle according to claim 17 wherein said envelope comprises support means for constituting a mechanical structure, said support means being in a material having a good transmission coefficient to the infra-red radiation.

19. The vehicle according to claim 18 wherein said support means includes said wall portion and is disposed between said inner layer material and said outer layer material.

20. The vehicle according to claim 18, wherein said outer layer material is a material having a good absorption coefficient to the visible sunlight.

21. The vehicle according to claim 17 wherein said film is a varnish being approximately one micron in thickness.

22. The vehicle according to claim 17 wherein said outer layer material is a metal selected from the group consisting of aluminum, silver and gold.

23. The vehicle according to claim 17 wherein said inner layer is a thin film of varnish on said support means.

24. The vehicle according to claim 22 wherein said metal is deposited in vacuo as a thin lining onto said support means.

* * * * *